June 16, 1953   J. B. CHRISTIANSEN   2,642,224
FEED CALCULATOR
Filed Jan. 21, 1949
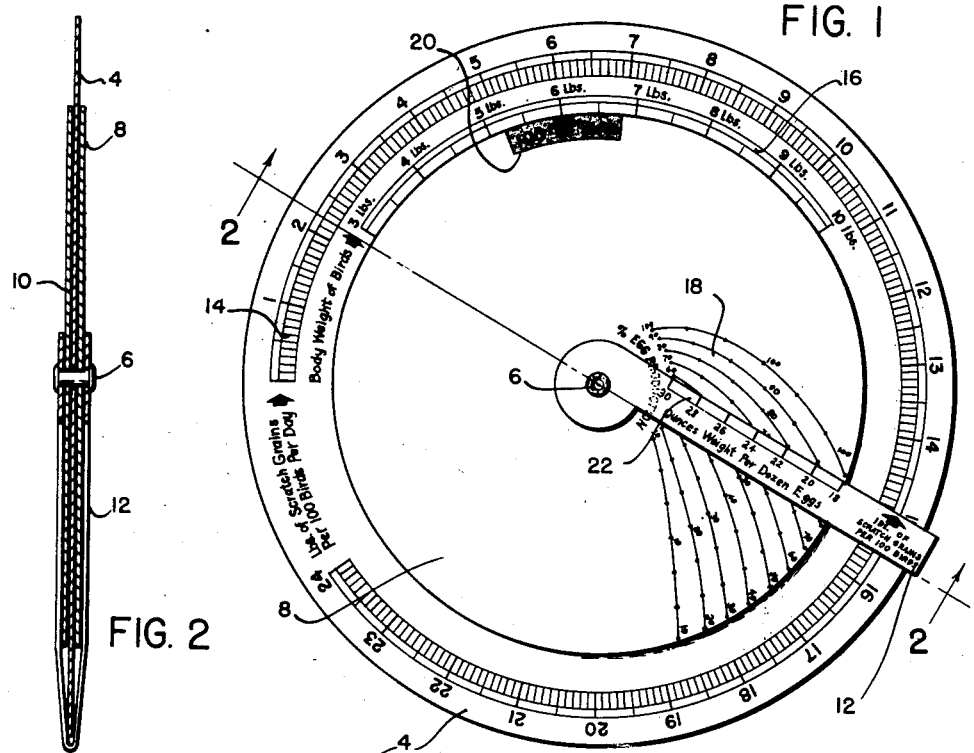
FIG. 1
FIG. 2
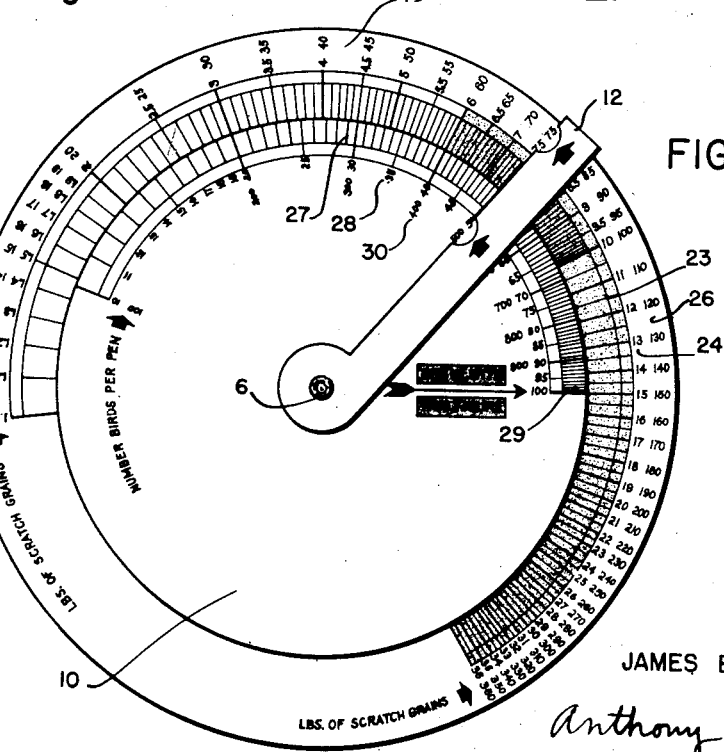
FIG. 3
INVENTOR
JAMES B. CHRISTIANSEN
BY Anthony A. Juettner
ATTORNEY Patented June 16, 1953

2,642,224

UNITED STATES PATENT OFFICE 2,642,224

FEED CALCULATOR

James B. Christiansen, Highland Park, Mich., assignor to General Mills, Inc., a corporation of Delaware Application January 21, 1949, Serial No. 71,855

2 Claims. (Cl. 235—83)

This invention relates to improvements in feed calculators.

In poultry feeding, the expensive component is mash and the inexpensive component is grain or scratch feed. There is an optimum amount of mash which will give maximum egg production. Increasing mash consumption above this amount will not increase egg production but will increase the cost of egg production. If the hens eat less mash than the optimum amount and more other feed, egg production will fall.

As birds find grain more palatable than mash, they will first eat the amount of grain available and then eat mash until full. Thus it becomes apparent if too much grain is available they will eat it at the expense of the mash, causing a drop in egg production. If too little grain is available the hens will eat more of the expensive mash to complete their meal, not increasing egg production but increasing cost of feeding. Therefore the feed hoppers may be kept full of mash at all times if the correct amount of grain is placed before the hens.

The nutritional value of the feed is utilized in egg production and body weight. Therefore the proper balance between grain and mash depends on the factors of bird body weight, per cent flock production and size of eggs produced.

Accordingly one of the objects of this invention is to provide a simple inexpensive calculator which makes it possible for the operator to quickly determine the correct amount of grain to feed a flock of hens, given the body weight, per cent production and egg weight.

Another object is to provide a novel calculator to accomplish the above objects and which will also indicate the amount of grain needed for the number of hens in the immediate flock.

Other objects and advantages of the invention will be apparent during the course of the following description and accompanying drawings, in which:

Figure 1 is a plan view of the calculator;

Fig. 2 is a transverse sectional view of the calculator taken on the plane 2—2, as shown in Fig. 1;

Fig. 3 is a plan view of the opposite side of the calculator, as shown in Fig. 1.

The preferred embodiment of the invention illustrated by the drawings comprises a base member 4 shown in the form of a circular disk, which carries at its center a mounting pin 6 in the form of a tubular eyelet. Rotatably mounted to the base member 4 by means of the mounting pin 6 is a concentric front disk 8. A similar back disk 10 is rotatably mounted to the back of the base member 4 by the mounting pin 6. Rotatable with respect to the disks, an indicator bar 12 is fastened by the mounting pin 6 over the front disk. The indicator bar 12 extends radially from the center to the edge of the calculator and doubles around the back to be secured by the mounting pin over the back disk 10 thus completing the calculator assembly.

Referring to the front of the calculator, as shown in Fig. 1, the base member 4 is provided with an arcuate scratch grain scale 14 swung from the center of the calculator which is coincident with the mounting pin. The graduations on this scratch grain scale 14 are representative of amounts of scratch grain for one hundred hens. Inward from this scale the base member 4 carries a concentric body weight scale 16. The graduations on this body weight scale 16 are representative of the body weight of the average hen. It is to be understood that the position of these scales could be reversed.

At the edge of the front disk is an index mark 20 to be corresponded with the correct figure on the body weight scale 16 of the base disk 4. In the present embodiment this index mark is positioned to operate for a one hundred bird flock, however, the mark could be positioned for any desired size flock. For example, if the mark were positioned for a fifty bird flock the calculator would then compute the correct amount of scratch grain for a fifty bird flock. The front disk 8 is provided with a production scale 18 comprising helical lines extending outwardly from the center to the outer edge. For convenience of space, only ten lines are used representing from 10 per cent to 100 per cent production.

An egg weight scale 22, to be corresponded with this production scale 18, is arranged along the indicator bar. This scale is graduated in ounces weight per dozen of eggs. It is to be understood that the egg weight scale 22 and the production scale 18 cooperate to insert the factor of total production and could be combined into a unit scale reading in total weight of eggs produced.

The operation utilizing the scales on the face of the computer will now be described. Per cent production, weight per dozen eggs and body weight of birds are the known factors and the unknown factor is the economically and nutritionally correct amount of scratch feed to be fed.

Using the front of the calculator, as shown in Fig. 1, the front disk 8 is rotated relative to the base member 4 until the index mark 20 is opposite the average body weight of the birds on the body weight scale 16. Holding the two disks together the indicator bar 12 is turned until the proper graduation on the egg weight scale 22 corresponds with the appropriate helical line of the production scale 18. The bar 22 will then be resting on the graduation on the scratch grain scale 14 of the base member 4 representing the correct number of pounds of scratch grain to be fed per one hundred birds.

Thus it can be seen the operator has at his fingertips a compilation of graphs and empirical formulas from which he can easily compute the correct amount of grain to feed. This can be quickly done at the feed lot assuring him of an accurate answer and saving much time and effort.

Now that the operator has the proper amount of feed for one hundred hens, he can find the correct amount to feed the immediate flock by use of the back of the computer.

The base member 4 has printed on the back an arcuate concentric graduated scale 23 swung from the center of the disks. The divisional marks of this scale represent pounds of scratch feed. One set of numbers is provided adjacent the graduated scale 23 for flocks under one hundred birds forming a small flock feed scale 24 and another set of numbers is provided for flocks over one hundred birds forming a large flock feed scale 26. Each feed scale may be printed in a different color, e. g. red and blue, to be easily distinguishable and to be easily matched with the corresponding flock scale 28 or 30.

The back disk 10 is provided with an arcuate graduated scale 27 also swung from the disk center. A set of numbers is provided adjacent this scale 27 representing flocks numbering under one hundred, forming a small flock size scale 28. A second set of numbers represents flocks over one hundred forming a large flock size scale 30. For ease of reading these scales may also be colored so that the color of the feed scale for flocks under one hundred corresponds to the flock szie scale for flocks under one hundred. The graduation mark on the scale 27 representative of one hundred hens on the small flock size scale 28 is darkened to form a reference mark 29.

From the amount of feed found to be proper for a one hundred hen flock, the amount for the immediate flock may be determined. In the present embodiment if the size of the immediate flock is over one hundred, the inner flock size scale 30 and outer feed scale 26 are used together. If the flock is smaller than one hundred, scales 28 and 24 are used.

To operate the back of the calculator, the back disk 10 is turned so the one hundred hen index mark 29 corresponds with the number on the feed scale 24 or 26 which represents the quantity of feed found to be proper for one hundred birds. Holding the base member 4 and back disk 10 together, the indicator bar 22 is then swung until it corresponds with the figure on the proper flock size scale 28 or 30 representing the number of hens in the flock. The indicator bar 12 will then be resting on the graduation of the feed scale 24 or 26, representing the amount of grain to be correctly fed to the present size flock.

The scales are arranged from empirical formulas based on nutritional value of feed, breed of chicken, living conditions and other factors affecting the egg output and bird health. It is to be understood the present embodiment is designed for chickens but could be used for other type fowl.

Thus it will be seen I have provided a feed calculating mechanism which may be easily and cheaply constructed of cardboard or similar material. The scale arrangement is uniquely adapted to accommodate all the necessary factors in determining the correct weight of grain to be fed. As egg production varies frequently, the amount of grain fed should be changed often. The use of the present calculator makes it possible to calculate the amount on the feed lot. As the factors of bird weight, per cent production and egg weight vary, the feed should be varied, thus using a minimum amount of the expensive mash portion of the diet to keep egg production at peak.

While I have shown and described but one form of the apparatus it will be apparent that it is capable of many modifications. Changes, therefore, in construction and arrangement may be made without departing from the spirit and scope of the invention as defined by the appended claims.

I claim as my invention:

1. A calculator for computing feeds for birds comprising a circular disk, a second circular disk of smaller diameter concentrically juxtaposed on said first disk, a bar extending radially on said disks, means rotatably attaching said disks and bar at the center of the disks for independent rotation, a circular circumferentially positioned scale on the outer edge of the first disk representative of pounds of scratch grains, a second circumferential scale positioned on the first disk within said first scale and being of a shorter arcuate length than said first scale and being representative of body weight of birds, a scale on the second circular disk having curved radial lines representative of per cent egg production, an index mark on the edge of the second disk circumferentially positioned with respect to the curved radial lines in accordance with a certain size flock, the index mark to be aligned with said second circumferential scale, and a scale positioned along the bar representative of ounce weight per dozen of eggs and to be aligned with the per cent egg production scale, the juncture of said scale on the radial bar and the scratch grains scale indicating the amount of scratch grain to be fed to a flock of said certain size.

2. A calculator for computing feeds for birds comprising a circular disk, a second circular disk of smaller diameter concentrically juxtaposed on said first disk, a bar extending radially on said disks, means rotatably attaching said disks and bar at the center of the disks for independent rotation, a circular circumferentially positioned scale on the outer edge of the first disk representative of pounds of scratch grains, a second circumferential scale positioned on the first disk within said first scale and being representative of body weight of birds, a scale on the second circular disk having curved radial lines representative of per cent egg production, an index mark having its circumferential position with respect to the curved radial lines dependent upon the predetermined size of the flock to be calculated and positioned on the edge of the second disk to be aligned with said body weight scale, and a scale positioned along one edge of the bar representative of ounce weight per dozen of eggs and to be aligned with the per cent egg production scale, the juncture of said edge of the radial bar and the scratch grains scale indicating the amount of scratch grain to be fed the flock of predetermined size.

JAMES B. CHRISTIANSEN.

References Cited in the file of this patent

UNITED STATES PATENTS

| Number | Name | Date |
|---|---|---|
| 426,444 | Hart | Apr. 29, 1890 |
| 460,930 | Cox | Oct. 6, 1891 |
| 1,207,439 | Picolet | Dec. 5, 1916 |
| 1,429,463 | Squyer | Sept. 19, 1922 |
| 2,405,113 | Clemons et al. | Aug. 6, 1946 |
| 2,436,391 | Leshner | Feb. 24, 1948 |

FOREIGN PATENTS

| Number | Country | Date |
|---|---|---|
| 586,215 | Great Britain | Mar. 11, 1947 |

OTHER REFERENCES

"Special Slide Rules," by J. N. Arnold, published by Purdue University in 1933 as Extension Series Bulletin No. 32; pp. 19–29.